(12) United States Patent
He et al.

(10) Patent No.: US 9,240,589 B2
(45) Date of Patent: Jan. 19, 2016

(54) ELECTRODE ACTIVE MATERIAL OF LITHIUM ION BATTERY AND METHOD FOR MAKING THE SAME

(71) Applicants: Tsinghua University, Beijing (CN); HON HAI PRECISION INDUSTRY CO., LTD., New Taipei (TW)

(72) Inventors: Xiang-Ming He, Beijing (CN); Li Wang, Beijing (CN); Jian-Jun Li, Beijing (CN); Jian Gao, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 248 days.

(21) Appl. No.: 14/070,647

(22) Filed: Nov. 4, 2013

(65) Prior Publication Data

US 2015/0111100 A1      Apr. 23, 2015

(30) Foreign Application Priority Data

Oct. 17, 2013   (CN) .......................... 2013 1 0486535

(51) Int. Cl.
| | | |
|---|---|---|
| *H01M 4/36* | (2006.01) | |
| *H01M 4/137* | (2010.01) | |
| *H01M 4/60* | (2006.01) | |
| *H01M 4/04* | (2006.01) | |
| *H01M 4/1399* | (2010.01) | |

(52) U.S. Cl.
CPC ............ *H01M 4/366* (2013.01); *H01M 4/0402* (2013.01); *H01M 4/137* (2013.01); *H01M 4/1399* (2013.01); *H01M 4/608* (2013.01)

(58) Field of Classification Search
CPC ... H01M 4/0402; H01M 4/137; H01M 4/366; H01M 4/608
See application file for complete search history.

(56) References Cited

U.S. PATENT DOCUMENTS

| | | | |
|---|---|---|---|
| 2011/0200875 A1 | 8/2011 | Miyuki et al. | |
| 2014/0030603 A1* | 1/2014 | Wegner ................. | H01M 4/137 429/232 |
| 2014/0154589 A1* | 6/2014 | Wegner ............... | H01M 4/1399 429/337 |

FOREIGN PATENT DOCUMENTS

| | | |
|---|---|---|
| CN | 102160217 | 8/2011 |
| CN | 102315424 | 1/2012 |
| CN | 102593433 | 7/2012 |

OTHER PUBLICATIONS

Fanous et al. Chemistry of Materials 2011, 23, 5024-5028.*
Ren et al., Fabrication of Li ion battery with sulfurized polyacrylonitrile, Fabrication of Li ion battery with sulfurized polyacrylonitrile, Battery Bimonthly, 2008, vol. 38, No. 2, p. 73-74.

* cited by examiner

*Primary Examiner* — Vu A Nguyen
(74) *Attorney, Agent, or Firm* — Novak Druce Connolly Bove + Quigg LLP

(57) ABSTRACT

A method for making an electrode active material of a lithium ion battery is provided. A sulfur grafted poly(pyridinopyridine) is synthesized. The sulfur grafted poly(pyridinopyridine) includes a poly(pyridinopyridine) matrix and a plurality of poly-sulfur groups dispersed in the poly(pyridinopyridine) matrix. The electrically conductive polymer is coated on a surface of the sulfur grafted poly(pyridinopyridine). An electrode active material of a lithium ion battery is also provided.

18 Claims, 3 Drawing Sheets

ELECTRODE ACTIVE MATERIAL OF LITHIUM ION BATTERY AND METHOD FOR MAKING THE SAME

CROSS-REFERENCE TO RELATED APPLICATIONS

This application claims all benefits accruing under 35 U.S.C. §119 from China Patent Application No. 201310486535.X, filed on Oct. 17, 2013, in the China Intellectual Property Office, the disclosure of which is incorporated herein by reference. This application is related to commonly-assigned applications entitled, "METHOD FOR MAKING ELECTRODE ACTIVE MATERIAL OF LITHIUM ION BATTERY," filed on Nov. 5, 2012, application Ser. No. 13/668,480, and "LITHIUM ION BATTERY," filed on Oct. 16, 2012, application Ser. No. 13/652,610.

BACKGROUND

1. Technical Field

The present disclosure relates to electrode active materials of lithium ion batteries and methods for making the same.

2. Description of Related Art

Polyacrylonitrile (PAN) is a high polymer composed of a saturated carbon skeleton containing cyano groups on alternate carbon atoms. PAN itself is not conductive but can be sulfurized to form sulfurized polyacrylonitrile which is conductive and chemically active. Specifically, the PAN powder and sulfur powder are mixed to form a mixture. The mixture is then heated, thereby forming sulfurized polyacrylonitrile. The sulfurized polyacrylonitrile can be used as a cathode active material of a lithium ion battery and has a high discharge capacity initially.

However, as the number of cycling of the lithium ion battery increases, the discharge capacity of the lithium ion battery decreases dramatically, which induces a relatively low capacity retention of the lithium ion battery. In some cases, the discharge capacity of the lithium ion battery decreases from 906.4 mAh at the first cycle to 740.0 mAh at the $20^{th}$ cycle. The capacity retention of the lithium ion battery after 20 cycles is only about 81.7%.

What is needed, therefore, is to provide an electrode active material of a lithium ion battery and a method for making the same, the electrode active material has a relatively high specific capacity and capacity retention.

BRIEF DESCRIPTION OF THE DRAWINGS

Many aspects of the present disclosure can be better understood with reference to the following drawings. The components in the drawings are not necessarily to scale, the emphasis instead being placed upon clearly illustrating the principles of the present embodiments. Moreover, in the drawings, like reference numerals designate corresponding parts throughout the several views.

DETAILED DESCRIPTION

Figure 1:
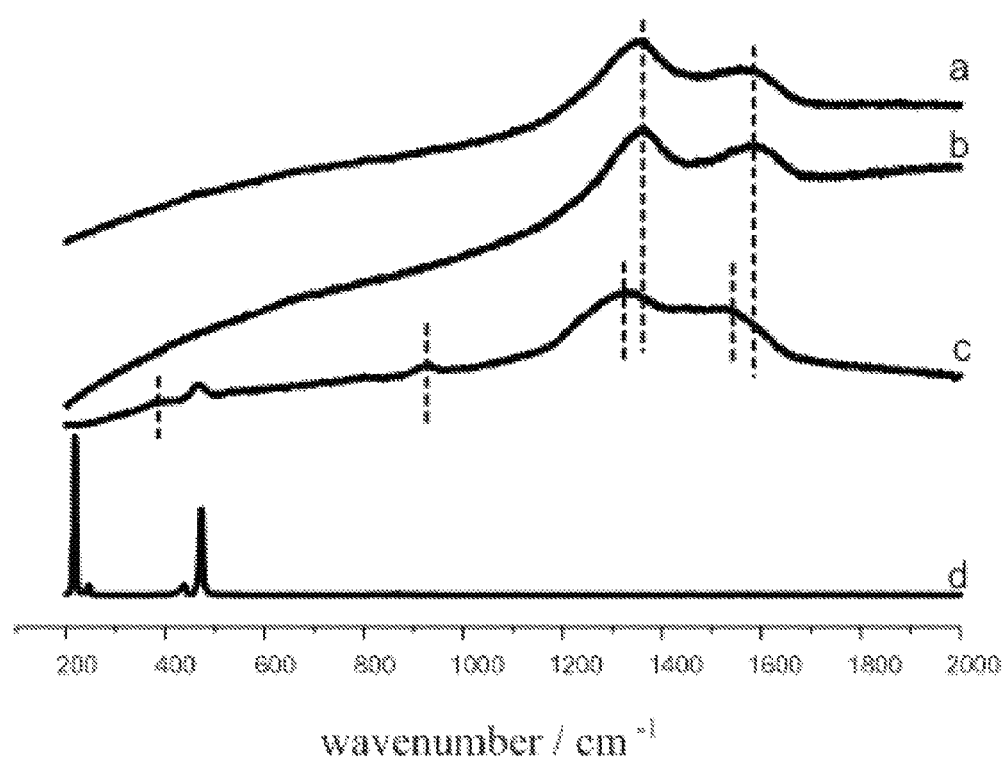
FIG. 1 shows a Raman spectra of (a) pyrolytic PAN in argon atmosphere, (b) pyrolytic PAN in air, (c) SPPY, and (d) elemental sulfur.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

One embodiment of an electrode active material of a lithium ion battery is provided. The electrode active material includes sulfur grafted poly(pyridinopyridine) (SPPY) and an electrically conductive polymer coated on a surface thereof.

One embodiment of a method for making the electrode active material of the lithium ion battery includes steps of:

S1, preparing SPPY; and

S2, coating the electrically conductive polymer on a surface of the SPPY.

Preparing SPPY

The SPPY includes poly(pyridinopyridine) (PPY) matrix and sulfur dispersed in the PPY matrix. In one embodiment, a weight percentage of the sulfur in the SPPY is equal to or smaller than 41%.

A material of the PPY matrix includes a chemical group of formula (1):

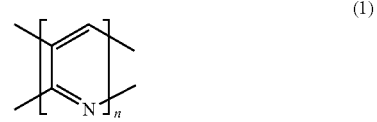

wherein n is an integer larger than 1.

The PPY matrix is formed from a cyclizing reaction of polyacrylonitrile (PAN).

The sulfur dispersed in the PPY matrix can be combined with the PPY matrix as a dopant. That is to say, the sulfur is combined with the PPY matrix with a covalent bond. The sulfur can exist as a "poly-sulfur group" consisting of one or more sulfur elements, which can be represented by a formula of $S_x$, wherein x is an integer between 1 and 8. In one embodiment, $2 \leq x \leq 8$ (e.g., x=4). When the "poly-sulfur group" includes more than one sulfur element, the sulfur elements can be connected to each other as a chain. For example, if x=4, a formula of the "poly-sulfur group" is —S—S—S—S—, and if x=8, a formula of the "poly-sulfur group" is —S—S—S—S—S—S—S—S—, wherein "—" represents a covalent bond. The SPPY can include a plurality of the poly-sulfur groups dispersed in the PPY matrix and combined with the PPY matrix with the covalent bonds.

In one embodiment, the $S_x$ is doped in the chemical group of formula (1) and covalently bonded with a carbon element thereof. For example, the SPPY can include a chemical group of formula (2):

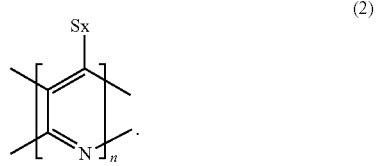

The molecular weight of the SPPY can be equal to or larger than 188.

The $S_x$ can also be covalently bonded with other functional groups at the other side of the sulfur chain. For example, the SPPY can include a chemical group of formula (3):

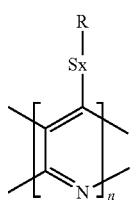
(3)

wherein R represents a functional group.

In the chemical group of formula (3), R is not limited and can be selected as needed, such as carboxyl groups, hydroxyl groups, and aromatic groups.

In another embodiment, R can also be the chemical groups of formula (1) or formula (2). For example, the SPPY can include a chemical group of formula (4):

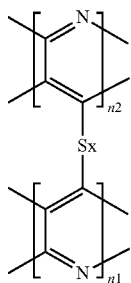
(4)

wherein n1 and n2 are both integers greater than 1, and n1 and n2 can be the same or different.

The chemical group of formula (4) is formed by two chemical groups of formula (1) connected by the $S_x$. Further, in the chemical group of formula (4), the two connected pyridinopyridine groups

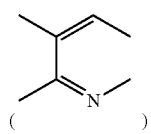

belong to different chemical groups of formula (1).

In another embodiment, the two connected pyridinopyridine groups can also belong to the same chemical group of formula (1). The two connected pyridinopyridine groups can be adjacent to each other or spaced by other pyridinopyridine groups.

For example, the SPPY can include a chemical group of formula (5) having two adjacent pyridinopyridine groups connected by $S_x$:

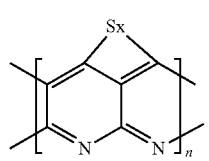
(5)

When the two pyridinopyridine groups connected by Sx are spaced, the SPPY can include a chemical group of formula (6):

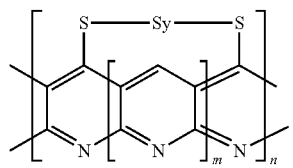
(6)

wherein Sy is also a "poly-sulfur group" including a sulfur chain, and m and y are both integers greater than 0. In one embodiment, m≤y≤6.

In another embodiment, the sulfur dispersed in the PPY matrix can be elemental sulfur composited with the PPY matrix. The elemental sulfur can have a shape of particles or grains. A size of the elemental sulfur particle can be very small. In one embodiment, one elemental sulfur particle can be one sulfur molecule (e.g., a $S_8$ ring). In another embodiment, one elemental sulfur particle can be a sulfur atom cluster consisting of a plurality of sulfur atoms. For example, the sulfur atom cluster can be $S_x$, wherein x is an integer between 1 and 7. If a large number of the elemental sulfur particles are uniformly dispersed in the PPY matrix, and each elemental sulfur particle is a sulfur molecule or sulfur atom cluster, the sulfur can be seen as monodispersed in the PPY matrix.

The SPPY can include the "poly-sulfur group" and the elemental sulfur. In the above formulas (1) to (6), the larger the values of n, n1, and n2, the more the pyridinopyridine groups are in the PPY matrix, the longer the chain of the pyridinopyridine groups, and the better the conductivity of the SPPY.

In step S1, the SPPY can be prepared by the following steps:

S11, mixing an elemental sulfur with a PAN to form a mixture;

S12, sintering the mixture in vacuum or within a protective gas at a temperature of about 250° C. to about 500° C., to form a sulfur containing composite; and S13, heating the sulfur containing composite to a temperature above a sublimation temperature of the elemental sulfur to remove at least a part of a non-reacted elemental sulfur from the sulfur containing composite.

In step S11, the elemental sulfur and the PAN can both have a shape of powder grains or particles. The powder grains or particles of the elemental sulfur and the PAN can be uniformly mixed by mechanically stirring the solid. The molecular weight of the PAN is not limited, and can be in a range from 1000 to 100000. The amounts of the elemental sulfur and the PAN are not limited. In one embodiment, a mass ratio of the elemental sulfur and the PAN can be in a range from about 1:2 to about 10:1.

In step S12, the solid elemental sulfur is sintered to the gas state and in uniform contact with the surface of the PAN. At the same time, the PAN has a pyrolysis and a cyclizing process during the heating to form a poly(pyridinopyridine) (PPY) matrix. The sulfur that is in contact with the PAN reacts with or combines with the cyclized PAN, thus achieving uniform distribution in the PPY matrix.

In the sulfur containing composite, a majority of the sulfur is the "poly-sulfur group" covalently bonded with the PPY matrix. The other part of the sulfur is elemental sulfur grains uniformly distributed in and composited with the PPY matrix. The elemental sulfur grains have a relatively large size and weight (e.g., larger than a molecular weight of $S_8$). The elemental sulfur grains are combined with the PPY matrix by a weak intermolecular force, such as van der Waals attractive force between the elemental sulfur grains and the PPY matrix. The protective gas can be an inert gas or a nitrogen gas. A comparison of Raman spectra of the sintered product, the elemental sulfur, and the pyrolytic pure PAN shows that compared with the two absorption peaks corresponding to the two C—C bonds (often referred to as G-band and D-band) of pyrolytic pure PAN, the two similar absorption peaks in the sintered product are shifted to lower wave numbers, which shows that the sulfur and the PPY matrix are bonded by C—S covalent bonds.

Further, step S12 can be processed in a sealed container filled with the protective gas. In the sealed container, the elemental sulfur will not leak out during the heating. Further, due to the gasification of the elemental sulfur, the gas pressure in the sealed container can be greater than 1 atmospheric pressure. Therefore, the sealed container can promote a uniform dispersion of sulfur in the product. In one embodiment, the heating temperature is about 320° C. to about 400° C. At a temperature of about 320° C. to about 400° C., the PAN can be fully cyclized to form a plurality of pyridinopyridine groups joined together, such that the n of formula (1) can be equal to or larger than 10. In one embodiment, the heating temperature is about 350° C. The heating time is determined by the amount of the mixture, and can be in a range from about 1 hour to about 10 hours.

In one embodiment, the mixture is heated in a sealed autoclave at a temperature of 350° C. for about 2 hours, and the weight percentage of the sulfur in the product of step S12 is about 47%.

In step S13, the heating temperature is about 150° C. to about 170° C. In the sintering step of S12, the elemental sulfur may not totally react with the PAN, and still remain as relatively large particles in the sulfur containing composite. During step S13, the non-reacted elemental sulfur having a relatively large size can be completely or at least partially removed from the sintered product. However, the "poly-sulfur group" and the elemental sulfur in small particle sizes would not be removed. Thus, the weight percentage of the sulfur in the SPPY is equal to or less than 41%. Sulfur is an active material in the charge/discharge process of the lithium ion battery. The removal of large-particle-size elemental sulfur can dramatically increase the capacity retention of the lithium ion battery.

The heating time of the step S13 is decided by the amount of the sulfur containing composite (e.g., about 30 minutes to about 4 hours). In one embodiment, the sulfur containing composite is heated in a vacuum at a temperature of about 150° C. for about 1 hour until the final product has a constant weight. The sulfur is about 41% of the final product.

Referring to FIG. 1, the final product after step S13 is compared with the elemental sulfur and the pyrolytic pure PAN in the Raman spectra. In FIG. 1, the curve a is the Raman spectra of the pyrolytic pure PAN formed by having pure PAN sintered in Ar gas, the curve b is the Raman spectra of the pyrolytic pure PAN formed by having pure PAN sintered in air, the curve c is the Raman spectra of the final product having the heating step of S13 in vacuum, and the curve d is the Raman spectra of the elemental sulfur. FIG. 1 shows that both curves a and b have main bands at 1582 cm$^{-1}$ and 1375 cm$^{-1}$, which are often referred to as the G mode and D mode, respectively. However, these bands (387 cm$^{-1}$ and 928 cm$^{-1}$) in the curve c (i.e., for SPPY) have shifted to a lower wavenumber, which indicates that the sulfur and the PPY matrix are bonded by C—S covalent bonds.

Further, after steps S12 and S13, the method can further include a step S14 of electrochemically reducing the "poly-sulfur group" of $S_x$ into an elemental sulfur. The reducing voltage for the electrochemically reducing "poly-sulfur group" of $S_x$ can be about 1.7 V to about 1.75 V (vs. Li$^+$/Li). In one embodiment, the final product can be arranged in an electrochemical reactor (e.g., in an electrochemical battery) as an anode electrode, and then the battery is discharged at a voltage of about 1.7 V to about 1.75 V (vs. Li$^+$/Li). In one embodiment, the counter electrode is lithium metal, the battery is discharged using a constant current density of about 20 mA/g until the battery reaches a discharge cut-off voltage of about 0V. The "poly-sulfur group" has one or more sulfur elements (less than 8), and the "poly-sulfur group" is joined to the carbon atoms of the PPY matrix by covalent bonds. Thus, due to the electrochemical reduction step, the covalent bonds are broken, and a plurality of elemental sulfur particles, each of which is one sulfur molecule (e.g., a $S_8$ ring) or a sulfur atom cluster having 1 to 7 sulfur atoms, can be formed. The plurality of elemental sulfur particles are uniformly dispersed in the PPY matrix. However, the electrochemical reduction step of step S14 is an irreversible reaction. The elemental sulfur particles cannot be joined to the carbon atoms of the PPY matrix again by covalent bonds through an electrochemical oxidation step.

In another embodiment, the above described step S13 can be substituted by a step of: S13', in which the sulfur containing composite is reacted with a reducing agent for elemental sulfur in a liquid phase medium to remove part of the sulfur from the sulfur containing composite.

In step S13', the reducing agent has a relatively strong reducibility and can have a reducing reaction with elemental sulfur, to reduce the elemental sulfur to a lower valence (e.g., −2) of sulfur. For example, the elemental sulfur can be reduced to form hydrogen sulfide ($H_2S$) or soluble sulfide, such as sodium sulfide ($Na_2S$), potassium sulfide ($K_2S$), and lithium sulfide ($Li_2S$). The reducing agent can be potassium borohydride ($KBH_4$) or hydrazine ($N_2H_4$).

The liquid phase medium can dissolve the reducing agent. The liquid phase medium can be water or ethanol. The sulfur containing composite is in solid state in the liquid phase medium and does not dissolve therein. The sulfur containing composite does not have a chemical reaction with the liquid phase medium. Thus, a liquid-solid mixture of the reducing agent and the sulfur containing composite can be formed in the liquid phase medium.

In the sulfur containing composite, there can be two forms of sulfur, one is the "poly-sulfur group" covalently bonded with the PPY matrix, the other is the elemental sulfur grains. The elemental sulfur grains having relatively large sizes can be removed from the sulfur containing composite by the reducing reaction. The sulfur containing composite can thus be formed into a sulfur grafted poly(pyridinopyridine) (SPPY) having the "poly-sulfur groups" covalently bonded with the PPY matrix.

In step S13', the amount of the reducing agent can be excessive to completely remove the elemental sulfur grains. However, the "poly-sulfur groups" cannot be removed because of the covalent bonds between the $S_x$ and the PPY matrix.

By removing the elemental sulfur grains, the capacity retention of the lithium ion battery using the SPPY as the electrode active material can be improved. Therefore, step S13' is not a purification step to remove the elemental sulfur. This is because the elemental sulfur itself has the capacity during the cycling of the lithium ion battery (i.e., the elemental sulfur itself is a cathode active material).

After step S13', the weight percentage of the sulfur element in the SPPY is equal to or less than 41%.

Step S13' can include steps of:

S131, introducing the sulfur containing composite into a container filled with the liquid phase medium;

S132, uniformly dispersing the sulfur containing composite in the liquid phase medium through mechanical stirring or ultrasonic vibration;

S133, adding the reducing agent into the container while continuously mechanically stirring or ultrasonically vibrating the liquid phase medium, to dissolve the reducing agent in the liquid phase medium and cause a reaction between the reducing agent and the sulfur containing composite; and S134, separating the achieved SPPY from the liquid phase medium and purifying the resulting SPPY.

Further, in step S133, the liquid phase medium can be heated to promote the chemical reaction between the reducing agent and the sulfur containing composite. The heating temperature in the step S133 can be in a range from about 90° C. to about 150° C.

In another embodiment, step S13' can include steps of:

S131', introducing the sulfur containing composite with the reducing agent into a container filled with the liquid phase medium;

S132', mechanically stirring or ultrasonically vibrating the liquid phase medium to uniformly disperse the sulfur containing composite in the liquid phase medium while dissolving the reducing agent in the liquid phase medium and causing a reaction between the reducing agent and the sulfur containing composite; and S133', separating the achieved SPPY from the liquid phase medium and purifying the resulting SPPY.

Further, in step S132', the liquid phase medium can be heated to promote the chemical reaction between the reducing agent and the sulfur containing composite. The heating temperature in the step S133 can be in a range from about 90° C. to about 150° C.

Figure 2:
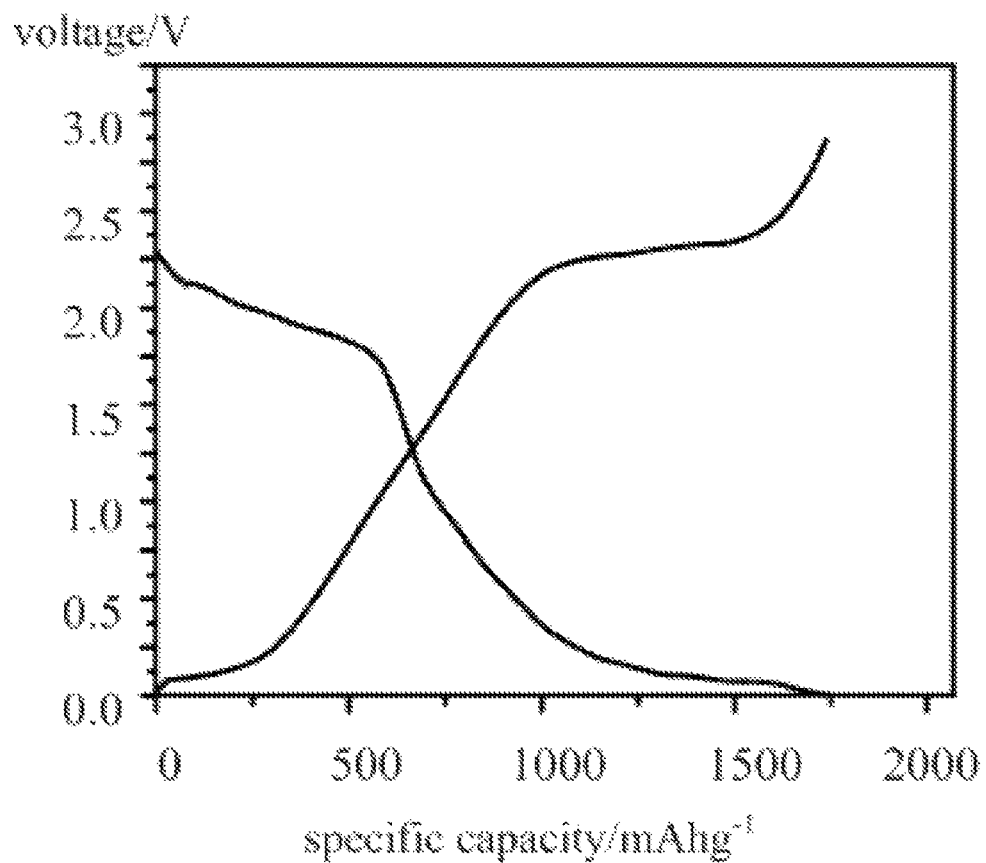
FIG. 2 shows discharge and charge curves of an embodiment of a lithium ion battery.

Referring to FIG. 2, a lithium ion battery using the SPPY as the anode active material and the lithium metal as the counter electrode is assembled. The lithium ion battery is cycled using a constant current in a galvanostatic charge/discharge measurement. As shown in the charge/discharge curves of the lithium ion battery in FIG. 2, the curves have plateaus between a voltage range of about 0.1 V to about 0.25 V. Therefore, the SPPY in the voltage range of about 0.1 V to about 0.25 V has a reversible charge/discharge capacity, and can be used as an anode active material of the lithium ion battery. More specifically, the SPPY has a discharge process at about 2 V and a charge process at about 2.25 V. Therefore, when the SPPY is used as the anode active material, the cathode active material can be selected from the cathode active materials having a relatively high discharge voltage (e.g., larger than or equal to about 4 V vs. $Li^+/Ai$).

Additionally, the curve of the SPPY has a discharge plateau at a voltage of about 2 V and a charge plateau at a voltage of about 2.25 V. Therefore, the SPPY can also be used as a cathode active material of a lithium ion battery.

The Coating of the SPPY

The electrically conductive polymer can be selected from at least one of polythiophene, polyaniline, polyacetylene, polypyrrole, poly(ethylene oxide), polyacene, polyphenylene, poly(p-phenylene vinylene), and polydiacetylene.

The electrically conductive polymer can be coated on the surface of the SPPY by dissolving the electrically conductive polymer in a liquid phase solvent to form a solution, and mixing the SPPY with the solution.

In another embodiment, the electrically conductive polymer can be coated in situ on the surface of the SPPY by:

S21, mixing the SPPY, a monomer of the electrically conductive polymer, an oxidizing agent, and a surfactant in a liquid phase solvent to form a mixture; and S22, polymerizing the monomer of the electrically conductive polymer in the liquid phase solvent to synthesize the electrically conductive polymer coating layer on the surface of the SPPY.

Further, to improve the conductivity of the electrically conductive polymer, a doping agent can be added to the mixture.

The SPPY is a solid in the liquid phase solvent, but the monomer of the electrically conductive polymer, the oxidizing agent, the surfactant, and the doping agent are soluble in a liquid phase solvent. Thus, the mixture is a solid-liquid mixture.

In the mixture, the SPPY is 100 parts, the monomer of the electrically conductive polymer is 10 to 50 parts, the oxidizing agent iss 10 to 500 parts, the surfactant is 1 to 10 parts, and the doping agent is 1 to 80 parts by weight. The liquid phase solvent can be at least one of water and organic solvent, such as ethanol. The oxidizing agent can be at least one of ferric chloride ($FeCl3$), ammonium persulfate, and ferric sulfate. The doping agent can be at least one of sodium dodecyl sulfonate (SDS) and sodium p-toluenesulfonate. The surfactant can be anionic surfactant, cationic surfactant, or nonionic surfactant, such as polyvinyl alcohol (PVA). During the mixing step, the mixture can be ultrasonically vibrated or mechanically stirred. During the polymerizing step, the temperature of the polymerization is decided by the material of the electrically conductive polymer, the temperature may be about 10° C. to about 60° C.

By coating the SPPY with the electrically conductive polymer, the conductivity of the electrode active material is improved, and the internal impedance of the lithium ion battery is decreased. The coating layer outside the SPPY prevents the dissolving of the sulfur in the electrolyte of the lithium ion battery, thus improving the cycling efficiency.

EXAMPLES

TABLE 1

|  | Weight percentage of the sulfur in the cathode active material | First cycle discharge capacity (mAh/g) | $50^{th}$ cycle discharge capacity (mAh/g) | Capacity retention after 50 cycles | $100^{th}$ cycle discharge capacity (mAh/g) | Capacity retention after 100 cycles |
|---|---|---|---|---|---|---|
| Example 1 | 41% | 1753 | 1698 | 96.8% | 1632 | 93.1% |
| Example 2 | 41% | 1759 | 1703 | 96.8% | 1680 | 95.5% |
| Example 3 | 35% | 1637 | 1505 | 91.9% | 1489 | 91.0% |
| Example 4 | 37% | 1677 | 1530 | 91.4% | 1494 | 89.1% |

TABLE 1-continued

|  | Weight percentage of the sulfur in the cathode active material | First cycle discharge capacity (mAh/g) | 50$^{th}$ cycle discharge capacity (mAh/g) | Capacity retention after 50 cycles | 100$^{th}$ cycle discharge capacity (mAh/g) | Capacity retention after 100 cycles |
|---|---|---|---|---|---|---|
| Example 5 | 41% | 1747 | 1685 | 96.5% | 1623 | 92.9% |
| Example 7 | 39% | 1703 | 1633 | 95.9% | 1626 | 95.5% |
| Comparative Example | 47% | 1788 | 1520 | 85.0% | 1321 | 73.9% |

Example 1

1.6 g of elemental sulfur powder is uniformly mixed with 1 g of PAN powder to form a mixture. The mixture is put into a sealed autoclave filled with nitrogen gas and heated to about 350° C. for about 2 hours. The heating is then stopped and the autoclave is cooled down to room temperature. The sulfur containing composite is achieved and then dispersed in 100 ml of water by ultrasonic vibration. Then 0.7 g KBH$_4$ is dissolved into water while stirring the water for about 2 hours. The KBH$_4$ reacts with the sulfur containing composite in the water, the solid product SPPY is filtered out from the water, washed twice, and then dried at about 60° C. A lithium ion battery is assembled using the SPPY as the cathode active material. The conducting agent is acetylene black. The binder is PVDF. The anode electrode is metal lithium. The electrolyte solution is 1 mol/L LiPF$_6$/EC+DEC (1:1, v:v). The lithium ion battery is cycled using a constant current in a galvanostatic charge/discharge measurement. As shown in Table 1, all the coulombic efficiencies per cycle for 100 cycles are above 99%.

Example 2

The SPPY is prepared using the same method as in Example 1. The SPPY is discharged at an anode of a primary battery from a voltage of about 1.75 V to about 0 V (vs. Li$^+$/Li). The counter electrode is metal lithium. The current density is about 20 mA/g. The SPPY then gets out from the anode of the primary battery and is assembled into a lithium ion battery as the cathode active material and cycled under the same conditions as in Example 1. The test result is shown in Table 1.

Example 3

The SPPY is prepared using the same method as in Example 1 except that the mixture of the elemental sulfur powder and the PAN powder is heated in an open environment under 1 atm. The lithium ion battery is assembled and cycled under the same conditions as in Example 1. The test result is shown in Table 1.

Example 4

The SPPY is prepared by using the same method as in Example 1 except that the mixture of the elemental sulfur powder and the PAN powder is heated at a temperature of about 300° C. The lithium ion battery is assembled and cycled under the same conditions as in Example 1. The test result is shown in Table 1.

Example 5

1.6 g of elemental sulfur powder is uniformly mixed with 1 g of PAN powder to form a mixture. The mixture is put into a sealed autoclave filled with nitrogen gas and heated to a temperature of about 350° C. for about 2 hours. The heating is then stopped and the autoclave is cooled down to room temperature. The sulfur containing composite is achieved and then dispersed in 100 ml of water through ultrasonic vibration. 25 ml of N$_2$H$_4$ having a concentration of 0.5 mol/L is then added into the water while stirring for about 2 hours. The N$_2$H$_4$ reacts with the sulfur containing composite in the water, and then the solid product SPPY is filtered out from the water, washed twice, and dried at about 60° C. The lithium ion battery is assembled and cycled under the same conditions as in Example 1. The test result is shown in Table 1.

Example 6

1.6 g of elemental sulfur powder is uniformly mixed with 1 g of PAN powder to form a mixture. The mixture is put into a sealed autoclave filled with nitrogen gas and heated to a temperature of about 350° C. for about 2 hours. The heating is then stopped and the autoclave is cooled down to room temperature. The sulfur containing composite is achieved and then heated in vacuum at about 150° C. for about 1 hour, until the sulfur containing composite has a constant weight to achieve the SPPY. 0.2 g SPPY is ball milled for about 4 hours and put into distilled water with 0.08 g pyrrole, 0.8 g FeCl$_3$.6H2O, and 4 mg PVA, to form the mixture. The mixture is stirred for about 7 hours at 60° C. and filtered to obtain the solid product. The solid product is washed for several times with distilled water to achieve the polypyrrole coated SPPY.

Example 7

The polypyrrole coated SPPY is prepared by the same method as in Example 6, except that about 0.12 g SDS as the doping agent is added into the mixture. The lithium ion battery is assembled and cycled under the same conditions as in Example 1. The test result is shown in Table 1.

Example 8

The polypyrrole coated SPPY is prepared by the same method as in Example 6, except that about 0.08 g SDS as the doping agent is added into the mixture.

Example 9

The polypyrrole coated SPPY is prepared by the same method as in Example 6, except that about 0.06 g SDS as the doping agent is added into the mixture, and the amount of the pyrrole is about 0.04 g.

Figure 3:
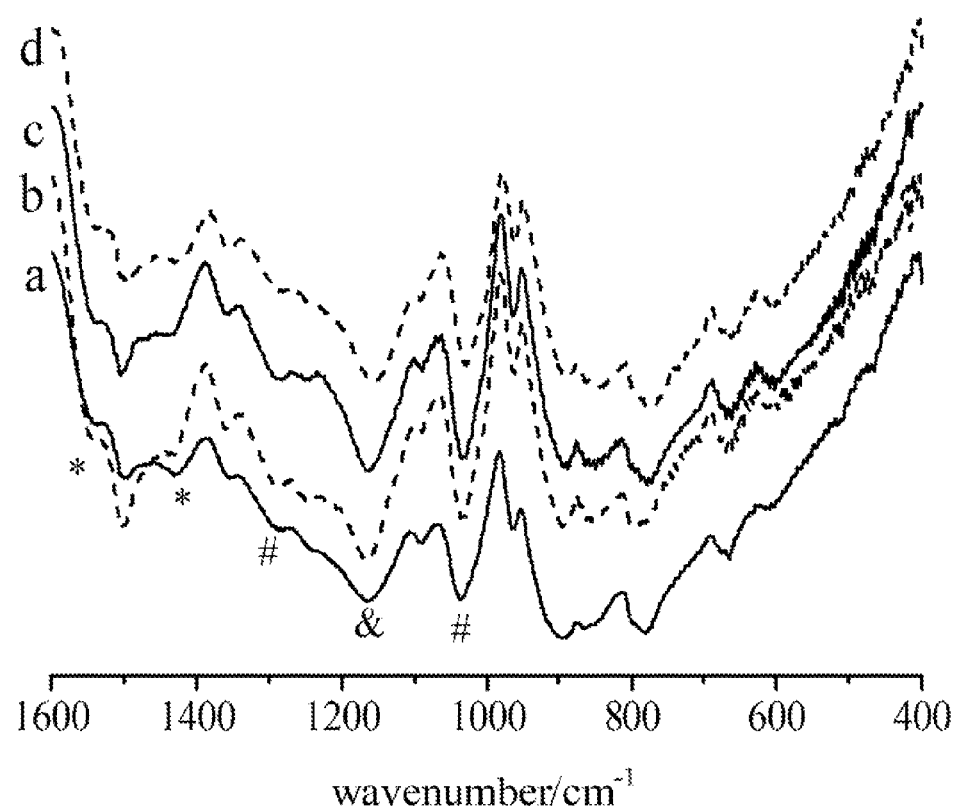
FIG. 3 shows a Fourier transform infrared spectroscopy (FT-IR) of embodiments of SPPY in situ coated by a conductive polymer.

The polypyrrole coated SPPY of Examples 6 to 9 has an FT-IR analysis. Referring to FIG. 3, curve a corresponds to the product of Example 6, curve b corresponds to the product of Example 7, curve c corresponds to the product of Example 8, and curve d corresponds to the product of Example 9. The vibration peaks corresponding to pyrrole are marked as "*", the vibration peaks corresponding to group of =C—H are marked as "#", and the vibration peaks corresponding to group of C—N are marked as "&".

Comparative Example 1.6 g of elemental sulfur powder is uniformly mixed with 1 g of PAN powder to form a mixture. The mixture is put into a sealed autoclave filled with nitrogen gas and heated to a temperature of about 350° C. for about 2 hours. After that, the heating is stopped and the autoclave is cooled down to room temperature. The sulfur containing composite is used as the cathode active material. The lithium ion battery is assembled and cycled under the same conditions as in Example 1. The test result is shown in Table 1.

Depending on the embodiment, certain steps of the methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than to limit the present disclosure. Variations may be made to the embodiments without departing from the spirit of the present disclosure as claimed. Elements associated with any of the above embodiments can be associated with any other embodiments. The above-described embodiments illustrate the scope of the present disclosure but do not restrict the scope of the present disclosure.

What is claimed is:

1. A method for making an electrode active material of a lithium ion battery comprising steps of:
   synthesizing sulfur grafted poly(pyridinopyridine) comprising a poly(pyridinopyridine) matrix and a plurality of poly-sulfur groups dispersed in the poly(pyridinopyridine) matrix; and
   coating a surface of the sulfur grafted poly(pyridinopyridine) with an electrically conductive polymer.

2. The method of claim 1, wherein the synthesizing sulfur grafted poly(pyridinopyridine) comprises steps of:
   mixing an elemental sulfur with a polyacrylonitrile to form a mixture;
   sintering the mixture in vacuum or a protective gas at a temperature of about 250° C. to about 500° C., to form a sulfur containing composite; and
   heating the sulfur containing composite to a temperature above a sublimation temperature of the elemental sulfur to remove at least a part of an un-reacted elemental sulfur from the sulfur containing composite.

3. The method of claim 2, wherein the sintering the mixture is in a sealed container filled with the protective gas at a temperature of about 320° C. to about 400° C.

4. The method of claim 1, wherein the synthesizing sulfur grafted poly(pyridinopyridine) comprises steps of:
   mixing elemental sulfur with a polyacrylonitrile to form a mixture;
   heating the mixture in vacuum or a protective gas at a heating temperature of about 250° C. to about 500° C., to form a sulfur containing composite; and
   reacting the sulfur containing composite with a reducing agent for elemental sulfur in a liquid phase medium to remove un-reacted elemental sulfur from the sulfur containing composite.

5. The method of claim 4, wherein the reducing agent is at least one of potassium borohydride and hydrazine.

6. The method of claim 4, wherein a mass ratio of the elemental sulfur and the polyacrylonitrile is in a range from about 1:2 to about 10:1.

7. The method of claim 4, wherein the reacting the sulfur containing composite with a reducing agent for elemental sulfur comprises steps of:
   introducing the sulfur containing composite into a container having the liquid phase medium filled therein;
   uniformly dispersing the sulfur containing composite in the liquid phase medium through mechanical stirring or ultrasonic vibration;
   adding the reducing agent into the container while continuously mechanically stirring or ultrasonically vibrating the liquid phase medium, to dissolve the reducing agent in the liquid phase medium and react the reducing agent with the sulfur containing composite; and
   separating the sulfur grafted poly(pyridinopyridine) from the liquid phase medium and purifying the sulfur grafted poly(pyridinopyridine).

8. The method of claim 7, wherein the liquid phase medium is heated at a temperature in a range from about 90° C. to about 150° C.

9. The method of claim 4, wherein the reacting the sulfur containing composite with a reducing agent for elemental sulfur comprises steps of:
   introducing the sulfur containing composite with the reducing agent into a container having the liquid phase medium filled therein;
   mechanically stirring or ultrasonically vibrating the liquid phase medium to uniformly disperse the sulfur containing composite in the liquid phase medium while dissolving the reducing agent in the liquid phase medium and reacting the reducing agent with the sulfur containing composite; and
   separating the sulfur grafted poly(pyridinopyridine) from the liquid phase medium and purifying the sulfur grafted poly(pyridinopyridine).

10. The method of claim 1, wherein the coating comprises:
    mixing the sulfur grafted poly(pyridinopyridine), a monomer of the electrically conductive polymer, an oxidizing agent, and a surfactant in a liquid phase solvent to form a mixture; and
    polymerizing the monomer of the electrically conductive polymer in the liquid phase solvent to synthesize the electrically conductive polymer coating layer on the surface of the sulfur grafted poly(pyridinopyridine).

11. The method of claim 10 further comprising a step of adding a doping agent to the mixture.

12. The method of claim 10, wherein the electrically conductive polymer is selected from the group consisting of polythiophene, polyaniline, polyacetylene, polypyrrole, polyacene, polyphenylene, poly(p-phenylene vinylene), polydiacetylene, and combinations thereof.

13. The method of claim 10, wherein the oxidizing agent is selected from the group consisting of ferric chloride, ammonium persulfate, ferric sulfate, and combinations thereof.

14. The method of claim 11, wherein the doping agent is selected from the group consisting of sodium dodecyl sulfonate, sodium p-toluenesulfonate, and combinations thereof.

15. An electrode active material of a lithium ion battery comprising sulfur grafted poly(pyridinopyridine) and an electrically conductive polymer coated on a surface thereof, wherein the sulfur grafted poly(pyridinopyridine) comprises a poly(pyridinopyridine) matrix and sulfur dispersed in the poly(pyridinopyridine) matrix.

16. The electrode active material of claim 15, wherein the sulfur is a poly-sulfur group consisting of one or more sulfur elements, represented by a formula of $S_x$, and x is an integer between 1 and 8.

17. The electrode active material of claim 15, wherein the sulfur is elemental sulfur composited with the poly(pyridinopyridine) matrix, the elemental sulfur has a shape of particles or grains, and one elemental sulfur particle is one sulfur molecule or a sulfur atom cluster consisting of a plurality of sulfur atoms.

18. The electrode active material of claim 15, wherein the electrically conductive polymer is selected from the group consisting of polythiophene, polyaniline, polyacetylene, polypyrrole, polyacene, polyphenylene, poly(p-phenylene vinylene), polydiacetylene, and combinations thereof.

* * * * *